3,784,659
METHOD OF PRODUCING CONTINUOUS PLASTIC SHAPES
Rosemarie Lupert, Eggli 1040, CH-9030
Abtwil, Switzerland
Filed Jan. 13, 1972, Ser. No. 217,504
Int. Cl. B29d 27/03
U.S. Cl. 264—47                     11 Claims

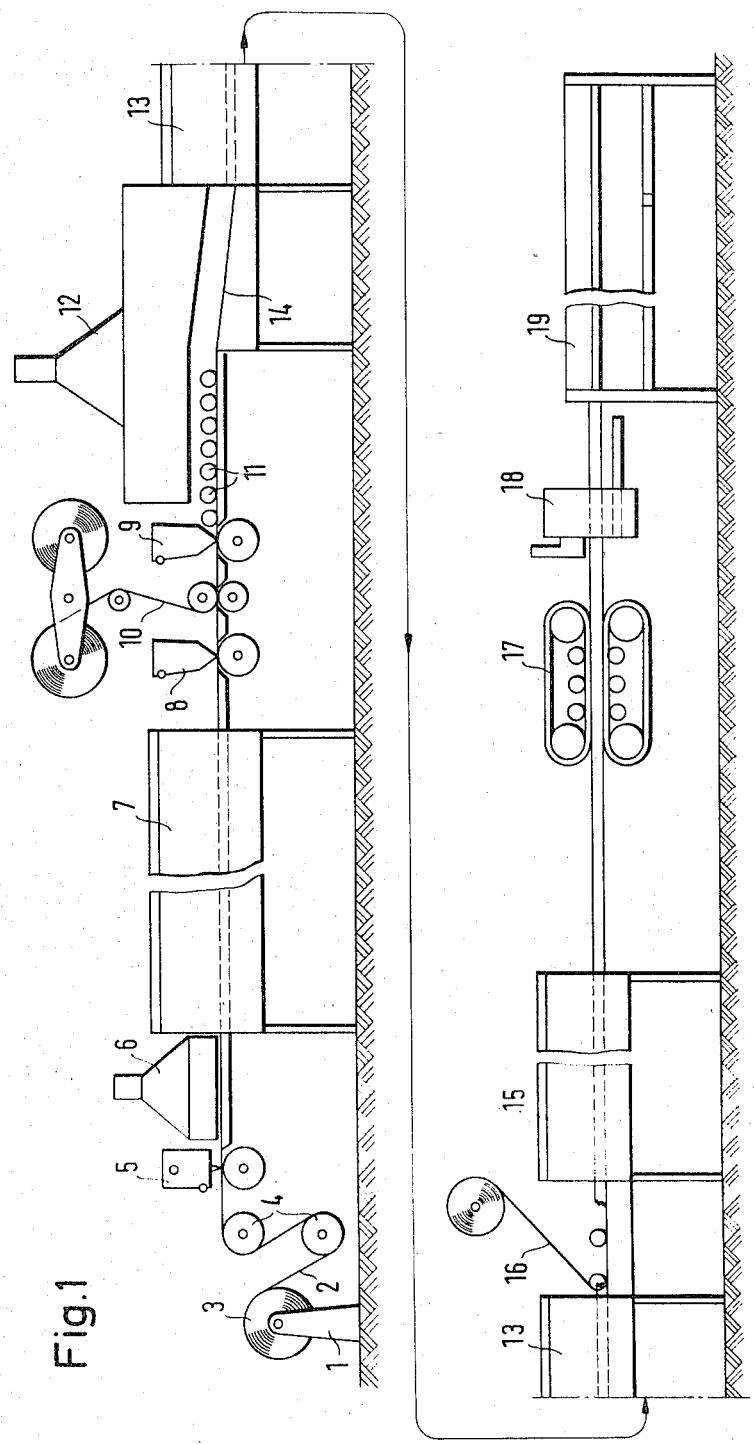

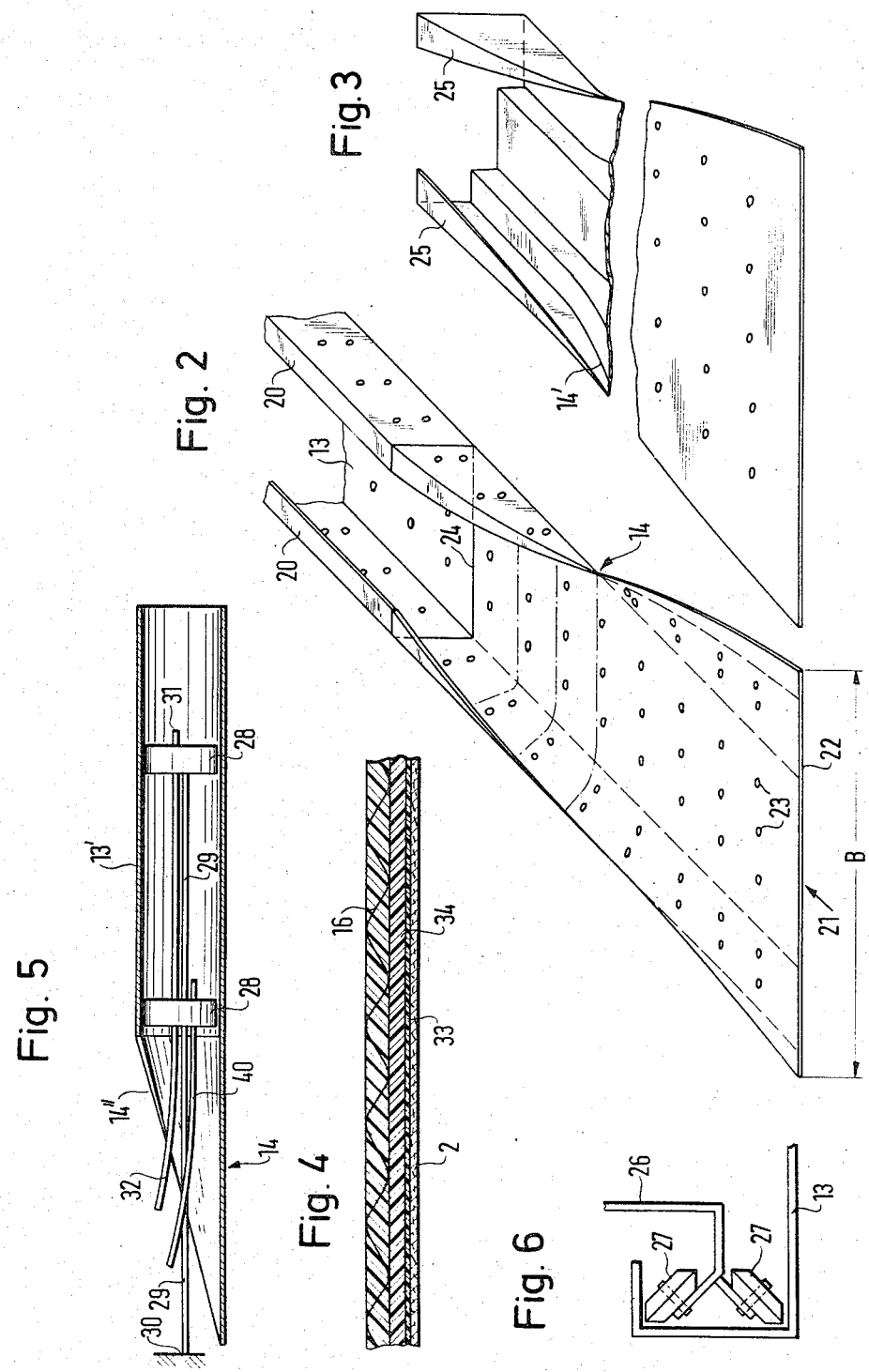

ABSTRACT OF THE DISCLOSURE

Continuous plastic shapes, such as channels or tubes are made from a laminate of curable, fluid, synthetic resin composition and a filamentous reinforcing material laid up on a continuously moving carrier foil by gradually deforming the laminate transversely to the direction of elongation. The laminate is held by suction or pressure in conforming engagement with a rigid shaping face whose cross section changes gradually in the direction of laminate movement, and the resin in the deformed laminate is cured thereafter.

---

This invention relates to continuous, plastic shapes reinforced with filamentous material, and particularly to a method in which a synthetic resin composition and the filamentous reinforcing material are laid up on a carrier foil in continuous operation and shaped.

It is known to prepare continuous plastic bodies reinforced with continuous strands or rovings of glass fibers by embedding the filamentous material in a fluid synthetic resin composition, to shape the reinforced material so prepared, and then to cure the resin composition. The known methods are limited to solid bars and to hollow shapes which are laterally open and relatively thin-walled.

It is a primary object of this invention to provide a method of making continuous, hollow, plastic shapes which are not limited as to their cross sectional shape and wall thickness, and of making solid shapes whose cores and surface layers consist of different plastics.

With this object and others in view, an elongated, longitudinally moving, continuous carrier foil is coated with a continuous layer of fluid, curable synthetic resin composition. A filamentous reinforcing material is embedded in the resin layer, and the laminate so constituted is held in conforming engagement with a rigid shaping face by differential pressure applied to one of the two major surfaces of the laminate while the laminate moves longitudinally relative to the face, the cross section of the shaping face changing gradually in the direction of laminate movement in planes transverse to that direction, whereby the laminate is deformed, and the synthetic resin composition in the deformed laminate is cured thereafter.

Other features, additional objects, and many of the attendant advantages of this invention will readily be appreciated as the same is better understood by reference to the following detailed description of preferred embodiments when considered in connection with the appended drawing in which:

FIG. 1 shows apparatus for performing the method of the invention in partly diagrammatic side elevation;

FIG. 2 illustrates shaping and calibrating elements of the apparatus of FIG. 1 in a perspective view;

FIG. 3 illustrates a modified shaping element in a fragmentary view corresponding to that of FIG. 2;

FIG. 4 shows a laminate produced as an intermediate in the apparatus of FIG. 1 in elevational, fragmentary section on a much larger scale;

FIG. 5 illustrates yet another shaping element for the apparatus of FIG. 1 and associated elements in side elevational section; and FIG. 6 shows a supplemental device used in conjunction with the device of FIG. 2 in fragmentary front elevation.

Referring now to the drawing in detail, and initially to FIG. 1, there is seen a stand 1 carrying a roll 3 of silicone-coated, strong carrier paper 2. The paper is led over guide rollers 4 and then passes a first coating apparatus 5 which applies a gel coat of thixotropic, unsaturated polyester resin composition. Vapors from the gel coat are removed by an exhaust hood 6 as the coated carrier paper 2 approaches a first curing oven 7 in which the gel coat is partly cured. Two layers of a thermo-setting resin composition are sequentially superimposed on the partly cured gel coat from a second and a third coating apparatus 8, 9, and a web 10 of glass fibers is deposited on the first thermosetting resin layer and covered by the second layer. Rollers 11 squeeze entrapped air and gas formed by polymerization from the fluid resin composition in which the reinforcing glass fibers are embedded while the gas is drawn off through a hood 12.

The continuous laminate now consisting of the siliconized paper carrier 2, the partly cured gel coat from the first coating apparatus 5, and the glass fiber material 10 embedded between the thermosetting plastic layers respectively applied by the coating apparatus 8 and 9 passes over a face of a shaping element 14 which deforms the initially flat laminate in planes perpendicular to the longitudinal direction of laminate movement, as will presently be described in more detail, until a channel-like shape is produced. The deformed laminate enters a calibrating channel 13 in which it is given its final shape. An additional layer 16 of reinforcing or decorative material is applied to the still fluid, viscous thermosetting resin composition, whereupon the product enters a final curing zone in an oven 15. The paper carrier 2 and the layers of other material built up on the carrier are drawn through the devices described so far by two continuous, driven belts 17 which engage respective opposite faces of the cured product. The latter is ultimately cut to desired lengths by a transversely moving cutter 18 and stacked in a storage bin 19.

The paper carrier 2 absorbs almost all the tensile stresses applied by the belts 17, but is no longer needed for this purpose after curing of the thermosetting resin. It does not adhere to the finished product and may be peeled off at any stage after passing the curing oven 15 or left on the product until the final use of the latter to provide surface protection for the surfacing material of the gel coat.

The materials employed in this invention are conventional in themselves. Thermosetting resin compositions which strongly adhere to embedded glass fibers or other filamentous reinforcing materials are staple articles of commerce, and so are gel coats which adhere firmly to specific resins suitable for reinforcement by filamentous materials. The gel coat duplicates the surface gloss of the silicone-coated carrier paper 2, and may be colored if so desired. The thermosetting resin compositions applied from the coating devices 8, 9 may differ from the gel coat by a larger proportion of reactive diluent, such as styrene. Obviously, synthetic resins, such as polyesters, which can be cured by the action of catalysts and without the use of heat may be employed. Glass fibers have known advantages when used as reinforcing filaments, but asbestos, synthetic fibers such as nylon, graphite, sapphire whiskers, and many other materials are commonly employed in this art and are suitable for the purpose of this invention. If so desired, a decorative web of paper or plastic may be interleaved with the carrier paper 2 on the roll 3 and adhere to the gel coat. Other variations of the basically conventional aspects of this method will readily suggest themselves to those skilled in the art.

An important feature of this invention is the method of deforming the initially flat laminate into shapes of widely varying cross section by contact of the laminate, more specifically, the carrier paper 2, with a shaping surface whose cross section is initially rectilinear, or substantially rectilinear, to match the flat configuration of the laminate, and gradually changes in the direction of carrier movement.

A shaping element 14 of sheet metal and a calibrating element 13 of the same material are shown in FIG. 2 to be arranged end to end. The still soft laminate enters the channel constituted by the elements 14, 13 in the direction of the arrow 21, and the rectilinear front edge 22 of the shaping element 14 has a width B equal to that of the paper carrier 2 and of the various layers of plastics and reniforcing fibers built up on the carrier. The paper is drawn through the device seen in FIG. 2 by the belts 17 while it is held in conforming engagement with the shaping element 14 by the pressure of the ambient atmosphere acting on the exposed, major, longitudinal surface on the laminate. Apertures 23 in the element 14, only partly shown in the drawing constitute the orifices of vacuum ducts, not otherwise illustrated, which partly relieve the underside of the traveling laminate of the atmospheric pressure.

The shaping element 14 is made from an initially rectangular piece of sheet metal, rigid plastic, or the like, whose shape gradually changes from the rectilinear front edge 22 to a rear edge 24 in planes transverse to the direction of travel of the laminate. The shape of the rear edge 24 is continued in the uniform cross section of the calibrating element 13, a channel of approximately U-shaped cross section whose flanges have turned-in rims 20. Perforations in the element 13 connected to the non-illustrated vacuum system hold the carrier paper 2 engaged with the shaping face of the element 13 while the resins in the laminate gel and cure sufficiently under the action of catalysts so as not to run from the vertical flange portions of the reinforced plastic structure under the force of gravity before entering the curing oven 15.

The product made on the shaping element 14 shown in FIG. 2 is typical of the very simple, laterally open shapes which can be produced by the method of the invention, but modifications of the shaping element permit a wide variety of more complex shapes to be produced as is exemplified by FIG. 3 which shows a shaping element 14' for making a complex, plastic door molding. The element 14' illustrated in FIG. 3 has been shortened for more convenient perspective representation, and will be understood to be followed by a calibrating section of uniform cross section identical with that of the far edge of the shaping element 14'. The inturned rims 25 of the flanges may be on the same level or on different levels, and they may be wide enough to meet or to overlap so that a laminate may be given a tubular ultimate shape.

Precise conforming engagement of the still soft laminate with the calibrating element 13 may be achieved by suitably increasing the number of suction apertures, and a laminating channel made of wire screen and enveloped by a vacuum box has been found effective in some instances. For laminates of relatively great wall thickness, the use of mechanical elements exerting positive pressure on the inner face of the laminate is preferred. By way of example, FIG. 6 illustrates rollers 27 mounted on a stationary support 26 and rotated freely on the support by frictional engagement with the traveling laminate. The outer circumference of each roller is formed by a circular edge in which two frustoconical faces meet at right angles. the rollers 27 impart to the laminate sharply angular inner contours not readily formed by atmospheric air pressure acting on the inner face of the laminate only. The rollers 27 may be supplemented or replaced by stationary rails and the like in an obvious manner.

FIG. 5 shows a shaping element 14'' whose entering edge is rectilinear as shown in FIGS. 2 and 3, and which gradually arches to a circular configuration at its exit end edjacent a cylindrical calibrating element 13'. Two hollow and light cylindrical cores 28 are axially spaced in the bore of the tubular element 13' and secured against joint movement with the traveling laminate, not itself shown in FIG. 5, by a wire 29 anchored in the stationary support structure 30 of the apparatus ahead of the shaping element 14''. The diameter of each core 28 is smaller than the inner diameter of the calibrating element 13' by the wall thickness of the laminate which is intended to be shaped on the apparatus of FIG. 5 so as to give a smooth inner surface to the tubular laminate formed.

A line 32 passes through both cores 28 and has an orifice 31 in the portion of the calibrating element 13' downstream from the cores 28. Another line 40 terminates between the two cores 28.

In operating the device of FIG. 5, an initially flat laminate is gradually bent into a cylindrical tube having a butt seam as it moves over the shaping face of the element 14'', being held to the face by atmospheric pressure. The apertures in the element 14'' through which a vacuum of about 100 mm. water column is applied to the carrier paper 2 have been omitted from FIG. 5 in order not to crowd the drawing. The apertures, not shown, in the axial portion of the calibrating element 14' between the cores 28 may be connected to a suction system including a vacuum pump, as described above, but it is preferred to provide fluid pressure by air admitted to the bore of the element 13' through the line 40 at a pressure slightly higher than that of the atmosphere, and to reduce friction between the carrier paper 2 and the inner wall of the element 13' by admitting air through the non-illustrated apertures in the element 13' which are axially coextensive with the pressure chamber bounded by the laminate and two cores 28, the force exerted by the internal air pressure prevailing over that of the external air cushion. Enough air escapes between the first core 28 and the laminates to reduce friction at that point.

The butt seam in the tubular laminate is no longer visible when the laminate passes the second core 28, and it is fluid tight. Catalyzed plastic foam, polyurethane or urea-formaldehyde, may then be injected into the tubular laminate from the orifice 31 in a manner conventional in itself, and the foam may be cured together with the tubular shell of the product during passage through the oven 15 (see FIG. 1).

The cross section of a laminate produced on shaping elements of the type shown in FIGS. 2 and 3 is illustrated in FIG. 4. The carrier paper 2 is overlaid in sequence with a gel coat 33, a layer of cured resin composition 34 from which the glass fiber reinforcement has been omitted for the sake of clarity, and an inner facing of plastic reinforced with corrugated cardboard 16.

The following conditions were maintained in making the plastic channel illustrated in FIG. 4:

The carrier foil had a longitudinal tensile strength of approximately 9 kg. per centimeter of width and carried a silicone resin coating of 3 g./m.$^2$ as a parting layer. It traveled at about 6 m./min. The gel coat 33 had a thickness of 0.3 mm. when applied to the carrier and was a colored commercial product of the unsaturated polyester type described above. It was partly cured in the first oven 7 at 95° C. in 65 seconds.

The commercial resin composition dispensed by the coating apparatus 8, 9 was of the unsaturated polyester-styrene type, catalyzed with methylisobutylketone peroxide and cobalt octoate, and was applied in respective amounts of 500 and 400 grams per square meter, the interposed glass fiber web having a weight of 450 g./m.$^2$.

The calibrating channel 13 was maintained at an average temperature of 110° C. by means of non-illustrated, external heating coils. The dwell time in the channel 13 was 75 seconds, and the resin composition was still somewhat soft when leaving the calibration channel 13.

The reinforcing layer 16 consisted of corrugated cardboard saturated with polyester resin which adhered well to the previously deposited thermosetting resin composition against which it was pressed by rollers, and the several plastic layers were cured in the curing oven 15 at 130° C. in 120 seconds. The hardness of the cured layer 34 was 47 Barcol units.

A tubular plastic body of the invention was prepared on apparatus corresponding to that of FIG. 1 and equipped with a shaping element 14″ and calibrating element 13′ as shown in FIG. 5 using the same materials as in the preceding example except as specifically stated otherwise.

The gel coat was applied in a thickness of 0.5 mm. and was partly cured in the oven 7 at 75° C. while traveling at 4 m./min. The two layers of thermoseting resin composition weighed 900 and 700 g./m.$^2$ and the interposed reinforcing layer consisted of 400 g./m.$^2$ glass staple fibers having an approximate length of 55 mm. and 600 g./m.$^2$ of glass fiber fabric. The calibrating channel 13′ was held at a temperature of 100° C., and a polyurethane foam composition was discharged into the tubular laminate from the orifice 31. The entrance portion of the curing oven was heated initially to 120° C., but the remainder of the oven had to be cooled slightly to about 125° C. in order not to permit the desired curing temperature of 130° C. to be exceeded because of the exothermic reaction. The total dwell time in the oven 15 was 180 seconds.

The specific operating conditions described above are those recommended by the manufacturers of the materials employed. They are presented merely as being typical of materials conventional in the art of making reinforced plastics, but the invention is not limited to the the specific materials employed, nor to the processing conditions which they require for best results.

The method of the invention permits a wide variety of laterally open or tubular shapes to be produced, and shapes formed in a first operation may be employed as inserts in a subsequently formed shape to produce double-walled elements. Other modifications and variations will readily suggest themselves to those skilled in the art.

It is therefore to be understood that, within the scope of the appended claims, the invention may be practiced otherwise than as specifically described.

What is claimed is:

1. A method of producing a continuous, solid body of reinforced synthetic resin composition which comprises:
    (a) coating one face of an elongated, longitudinally moving, continuous carrier foil with a layer of fluid, curable, synthetic resin composition;
    (b) embedding in said layer a filamentous reinforcing material, whereby an elongated, longitudinally continuous laminate having two major longitudinal surfaces is formed;
    (c) holding one of said surfaces in conforming engagement with a substantially rigid shaping face by fluid pressure applied to the other one of said surfaces while the laminate moves in a longitudinal direction,
        (1) the cross section of said face changing gradually in said direction, whereby said laminate is deformed transversely of said direction; and
    (d) curing the synthetic resin composition in the deformed laminate until the laminate is solid.

2. A method as set forth in claim 1, wherein said carrier foil engages said shaping face in area contact while said laminate is being deformed.

3. A method as set forth in claim 2, wherein said laminate is further held in engagement with said shaping face by solid pressure elements engaging said other surface of said laminate.

4. A method as set forth in claim 2, wherein said laminate is deformed until it assumes a tubular shape having a longitudinal butt seam and a bore extending in said direction.

5. A method as set forth in claim 4, wherein a core is secured in said bore against joint movement with said laminate in said direction, said core being dimensioned for internal calibrating said tubular shape.

6. A method as set forth in claim 4, wherein a curable plastic foam is injected into said bore substantially to fill the same, said foam beeing cured in said bore.

7. A method as set forth in claim 6, wherein a core is secured in said bore against joint movement with said laminate in said direction, said core being dimensioned for internally calibrating said tubular shape, and said foam being injected into a portion of said bore adjacent said core in said direction.

8. A method as set forth in claim 4, wherein two cores spaced from each other in said direction are secured in said bore against joint movement with said laminate in said direction, and a fluid is fed to the space bounded by said laminate and said two cores under a pressure sufficient to hold said laminate in engagement with said shaping face.

9. A method as set forth in claim 2, wherein a continuous sheet of surfacing material is placed on said carrier foil prior to said coating, said surfacing material is adhesively secured to said synthetic resin composition before the curing of the latter is completed, and said carrier foil is thereafter removed from said surfacing material.

10. A method as set forth in claim 2, wherein said laminate is substantially planar when initially engaging said shaping face.

11. A method as set forth in claim 1, wherein said shaping face is perforated, fluid is drawn from the perforations of said shaping face, and ambient air exerts said fluid pressure.

References Cited
UNITED STATES PATENTS

| | | | |
|---|---|---|---|
| 3,383,257 | 5/1968 | James | 264—47 |
| 3,297,802 | 1/1967 | Powers | 264—47 |

MAURICE J. WELSH, Jr., Primary Examiner